United States Patent [19]

Smillie, III et al.

[11] Patent Number: 5,054,578

[45] Date of Patent: Oct. 8, 1991

[54] POWER-OPERATED LIFT AND PRESENTING MECHANISM

[75] Inventors: Charles M. Smillie, III, West Bloomfield; Anthony J. Tomac, Troy, both of Mich.

[73] Assignee: C. M. Smillie & Company, Ferndale, Mich.

[21] Appl. No.: 465,298

[22] Filed: Jan. 16, 1990

Related U.S. Application Data

[63] Continuation-in-part of Ser. No. 138,916, Dec. 28, 1987, Pat. No. 4,941,797, which is a continuation-in-part of Ser. No. 17,922, Feb. 24, 1987, Pat. No. 4,725,183.

[51] Int. Cl.$^5$ .................... B65G 67/00; B66B 11/04
[52] U.S. Cl. ........................ 182/63; 187/18; 296/26; 414/462; 414/495; 414/541; 182/141
[58] Field of Search ............... 414/462, 345, 495, 497, 414/522, 540, 541, 545, 501, 589, 678; 296/26; 187/8.71, 18; 182/63, 69, 141

[56] References Cited

U.S. PATENT DOCUMENTS

| | | | |
|---|---|---|---|
| 686,458 | 11/1901 | Johnson | 182/141 X |
| 2,091,069 | 4/1936 | Girl | |
| 2,094,401 | 4/1936 | Girl | |
| 2,454,566 | 6/1945 | Pfeiffer | |
| 2,862,689 | 12/1958 | Dalrymple et al. | 187/18 X |
| 2,890,908 | 6/1959 | McLean et al. | |
| 2,953,287 | 9/1960 | Werner | |
| 3,329,292 | 6/1967 | Haddock | |
| 3,350,065 | 10/1967 | Mankey | 187/18 X |
| 3,623,707 | 11/1971 | Klopp | |
| 3,726,422 | 4/1973 | Zelin | |
| 3,901,356 | 8/1975 | Butler | 187/8.71 |
| 3,982,718 | 9/1976 | Folkenroth et al. | |
| 3,991,857 | 11/1976 | Wolk et al. | |
| 4,114,854 | 9/1978 | Clark | 187/18 X |
| 4,221,528 | 9/1980 | Gordos | |
| 4,251,178 | 2/1981 | Bourgraf et al. | |
| 4,405,116 | 9/1983 | Eisenberg | |
| 4,549,720 | 10/1985 | Bergenwall | 187/8.71 X |
| 4,604,022 | 8/1986 | Bourgraf | |
| 4,685,860 | 8/1987 | McFarland | |
| 4,712,653 | 12/1987 | Franklin et al. | 182/141 X |
| 4,724,930 | 2/1988 | VanLierop | 187/8.71 X |
| 4,725,183 | 2/1988 | Smillie, III | |
| 4,749,169 | 6/1988 | Pickles | |
| 4,799,849 | 1/1989 | Miller | |
| 4,890,692 | 1/1990 | Oakman | 182/141 |
| 4,969,793 | 11/1990 | Pawl | 187/18 X |

FOREIGN PATENT DOCUMENTS 297907  7/1932  Italy .................... 187/8.71

OTHER PUBLICATIONS

George, Handcart Trunk Carrier, from Xerox Disclosure Journal, Mar./Apr. 1983, pp. 175-176.

*Primary Examiner*—Robert J. Spar
*Assistant Examiner*—Robert S. Katz
*Attorney, Agent, or Firm*—Dykema Gossett

[57] ABSTRACT

A power-operated lift and presenting mechanism is disclosed which lifts an article stored on a platform member in a vehicle trunk to an upwardly lifted position. A start assist member is included to assist in the initial movement of the platform member from a lowered stored position to the upwardly lifted position. The platform member is forced upwardly at two locations when it initially begins to move. The motor has a short period of time to warm up before it begins lifting the platform member. The lift and presenting mechanism is incorporated into controls for vehicle, such that when a trunk opening switch within the vehicle cab is actuated, the lift and presenting mechanism is automatically actuated to drive the platform member to an upwardly lifted position. A switch is placed in an easily accessible position within the vehicle trunk and includes a kill switch to disconnect the automatic actuation.

5 Claims, 5 Drawing Sheets

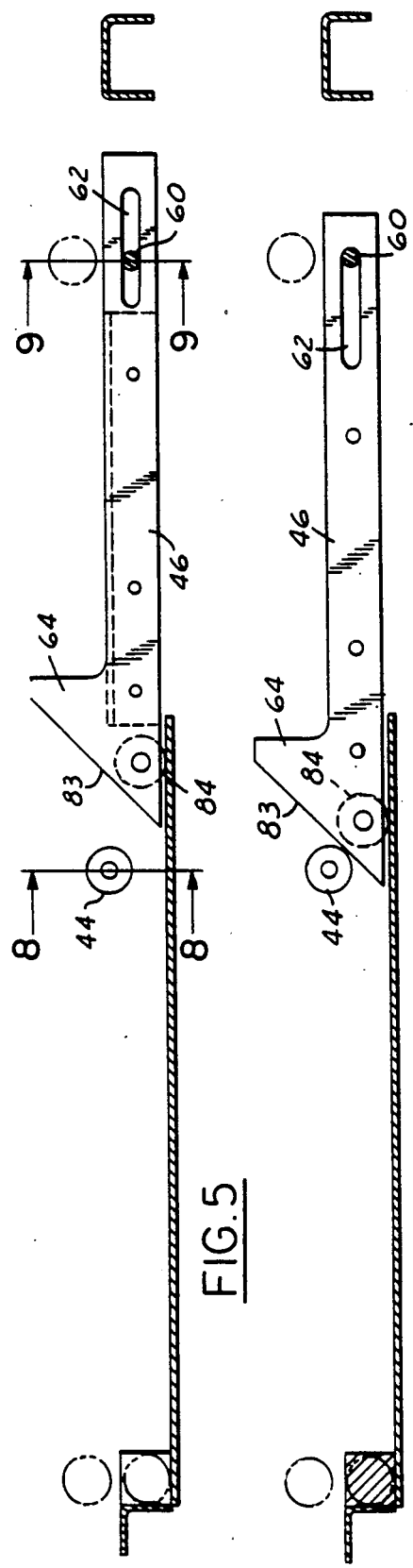
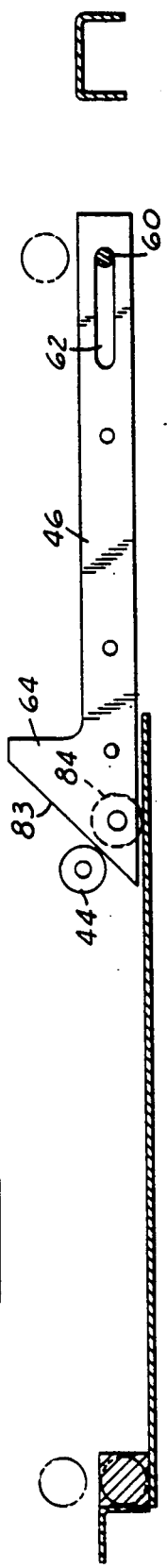
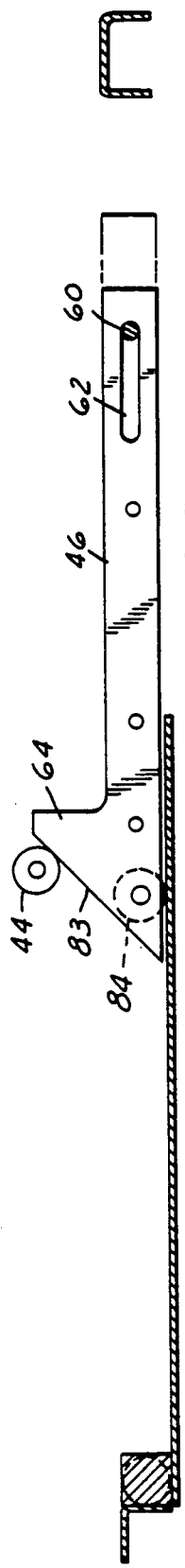
FIG.5  FIG.6  FIG.7
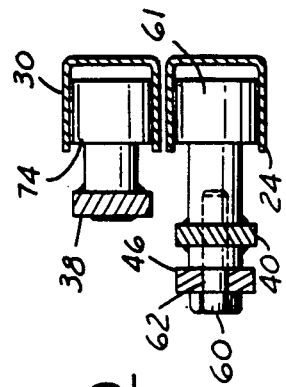
FIG.9
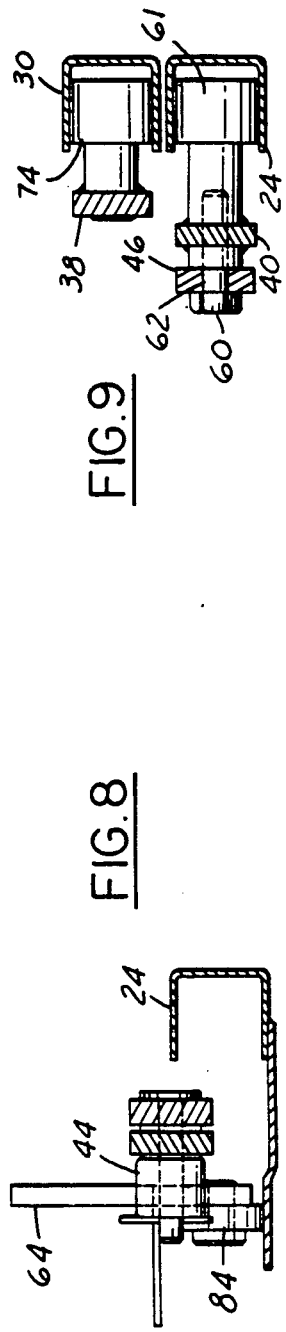
FIG.8

POWER-OPERATED LIFT AND PRESENTING MECHANISM

This application is a continuation-in-part of Ser. No. 138,916, filed Dec. 28, 1987, now U.S. Pat. No. 4,941,797, which is a continuation-in-part of Ser. No. 07/017,922, filed Feb. 24, 1987 now U.S. Pat. No. 4,725,183, the disclosures of which are expressly incorporated by reference into this application.

BACKGROUND OF THE INVENTION

This application relates to lift and presenting mechanisms for assisting in lifting an article from the trunk of a vehicle, and more particularly relates to an improved lift and presenting mechanism having start assist means which reduce the load on the motor when it initially begins to lift the article.

In modern vehicle design, trunks are often formed deeper to provide more trunk space. As trunks become deeper, it becomes more difficult to lift and remove articles that are stored in the trunk. This is particularly true when heavy articles are stored in the trunk, or if the operator suffers from a back problem or other disability.

Lift and presenting mechanisms are disclosed in the parent applications and utilize a small motor and a carriage assembly of some sort to lift a platform from a lowered storage position to a upwardly lifted position at which an operator may easily remove an article. Due to size limitations of the trunk, the various components that make up the lift and presenting mechanisms also have size restrictions placed on them. It may not be possible to use a large bulky motor. Problems may be encountered since a relatively small motor could have some difficulty initially lifting the article.

In moving a heavy article, the greatest load is associated with initially starting movement, or overcoming the inertia. This is especially true when a particularly heavy article is lifted.

It is therefore an object of the present invention to disclose a lift and presenting mechanism in which there are start assist means to assist the initiation of movement of the platform from a lowered storage position to a upwardly lifted position.

In addition, it is an object of the present invention to disclose a lift and presenting mechanism having an improved control assembly providing an operator with easier access to the controls, and more versatility in available controls.

SUMMARY OF THE INVENTION

The present inventions discloses an improved lift and presenting mechanism, including a platform mounted above a base member that is movable through a carriage assembly from a lowered storage position, where it vertically overlies the base member, to an upwardly lifted, or presenting, position where it extends vertically outwardly of the trunk of a vehicle.

A lift and presenting mechanism according to the present invention comprises a base that may be fixed to a vehicle trunk floor, a platform member, and a carriage assembly connecting the platform member to the base. Motor means are included for moving the carriage assembly to drive the platform member from a lowered storage position to a upwardly lifted position. In addition, start assist means are included to assist the initiation of movement of the carriage assembly as it begins to move the platform member between the lowered storage position and the upwardly lifted position. The start assist means are particularly valuable when heavy articles are stored on the platform member in the trunk.

In a preferred embodiment of the present invention, the carriage assembly includes a pair of cross-connected lift bars, a first of which is pinned to the base and connected by a roller for sliding movement on the platform member, and a second of which is pinned to the platform member and connected by a roller for sliding movement on the base. One pair of lift bars is connected to each lateral side of the platform and the base. A rotary motor drives an actuation screw having threads received in a threaded block of a crossbeam member which is restrained from rotation, but allowed to move longitudinally with respect to the base and the platform member. By rotating the actuation screw within the threaded block, the crossbeam moves longitudinally, and a start assist member engages a central roller mounted to a central pin connecting each pairs of lift bars. The start assist member has an inclined face in contact with the central roller when the platform member is at the lowered storage position.

The start assist member is preferably connected to the second lift bar by a slot that allows the start assist member to move a small longitudinal distance before engaging the roller slidably mounted on the base. This allows the motor time to warm up. Once the slot does engage the roller, it begins to move it longitudinally, which in turn causes the two lift bars to pivot upwardly with respect to each other at the central pin and move the platform member from the lowered storage position to the upwardly raised position.

The timing of the slot engaging the roller is selected such that it does not occur until after the inclined face contacts the central roller. The inclined face forces the central roller vertically upwardly. By having the inclined face moving the center roller upwardly at the same time the slot begins engaging and moving the roller on the lift bar, the inertia of the platform and a stored article is easily overcome. This presents a much lower start-up load on the motor and allows the lift and presenting mechanism to use a smaller less powerful motor.

The present invention discloses improved controls, including an on-off switch mounted to the trunk wall near the top, such that it is easily accessible to an operator. Controls are also included that initiate the lift and presenting mechanism upon opening of the trunk from inside the cab of the vehicle. When an operator opens the trunk through a switch within the vehicle cab, the lift and presenting mechanism may be automatically actuated to move the platform member to an upwardly lifted position. When the operator leaves the car, the article is already being moved vertically upwardly. The switch member mounted within the trunk wall has a kill switch that allows this automatic function to be stopped or disconnected.

These and other objects and features of the present invention can be best understood from the following specification and drawings, of which the following is a brief description.

BRIEF DESCRIPTION OF THE DRAWINGS

FIGS. 5-7 show consecutive steps in the movement of the lift and carriage mechanism from a lowered storage position to its upwardly lifted position along line 5—5 as shown in FIG. 2.

FIG. 8 is a cross-sectional view along line 8—8 as shown in FIG. 5.

FIG. 9 is a cross-sectional view along line 9—9 as shown in FIG. 5.

DETAILED DESCRIPTION OF A PREFERRED EMBODIMENT

Figure 1:
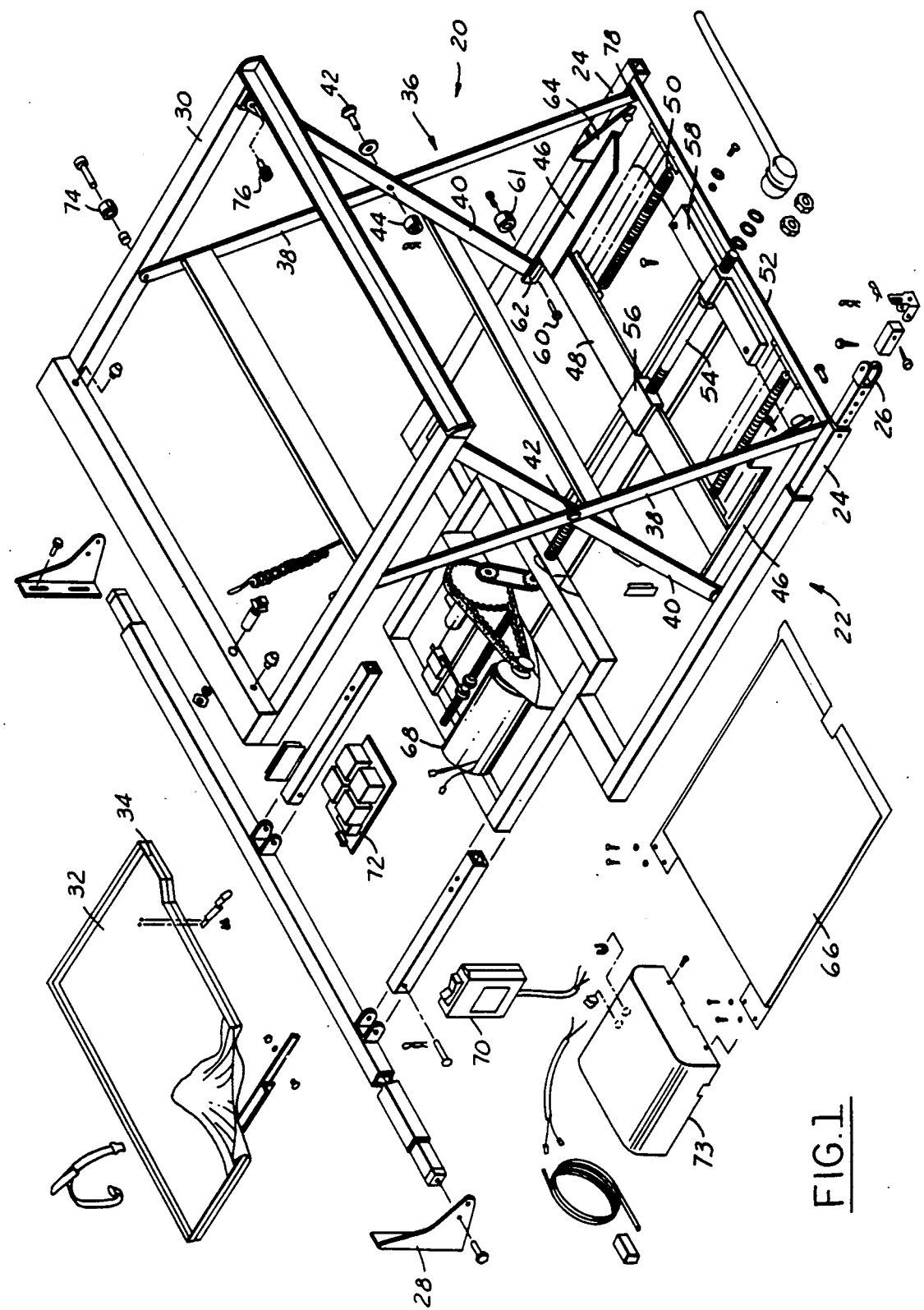
FIG. 1 is an assembly view showing an improved lift and presenting mechanism according to the present invention.

FIG. 1 is an assembly view showing lift and presenting mechanism 20 according to the present invention including base 22 having base arms 24 fixed through rear connections 26 to the inside of a vehicle trunk. Front connections 28 fix the other longitudinal end of lift and presenting mechanism 20 to a vehicle trunk.

Platform member 30 is mounted vertically above base 22, and a one-piece plastic foam molded tray 32 is slidably mounted upon platform 30. Tray 32 includes integrally molded handles 34.

Carriage assembly 36 includes pairs of outside lift bar 38 and inside lift bar 40, pivotally pinned at central pin 42, which receives central roller 44. One pair is mounted to each lateral side of carriage assembly 36. Start assist members 46 are fixed to each lateral side of crossbeam 48. Springs 50 bias crossbeam 48 rearwardly towards rear base bar 52.

Actuation screw 54 is rotatably received within threaded block 56, and is also received in screw bearing 58. The portion of actuation screw 54 received within threaded block 56 has threads at an outer periphery. Threaded block 56 is fixed to crossbeam 48, which is prevented from rotating. Rotation of actuation screw 54 within threaded block 56 causes crossbeam 48 to move longitudinally rearwardly and forwardly.

Actuation pin 60 is mounted to roller 61 and connects start assist member 46 to inside lift bar 40 through slot 62. Ramp member 64 is fixed to start assist member 46. Base cover 66 covers the entirety of the lower portion of lift and presenting mechanism 20.

Outside lift bar 38 is connected to roller 74 and slidably received on platform member 30, while being pinned at 78 to base 22. Inside lift bar 40 is connected to roller 61 and slidably received on base 22 while being pinned at 76 to platform member 30.

A reversible motor 68 rotatably drives actuation screw 54, the rotation of which causes crossbeam 48 to move longitudinally between forward and rear positions. Switch 70 controls the operation of motor 68 and allows an operator to manually initiate motor 68 and drive platform 30 from a lowered storage position to an upwardly lifted position. Further controls within the cab of the vehicle automatically actuate motor 68 upon actuation of a truck opening switch. Switch 70 includes a kill switch to disconnect this automatic actuation, as may be desirable when no article is stored on the platform. Control board 72 mounted near motor 68 effectuates the disclosed functions. Motor cover 73 covers motor 68.

Figure 2:
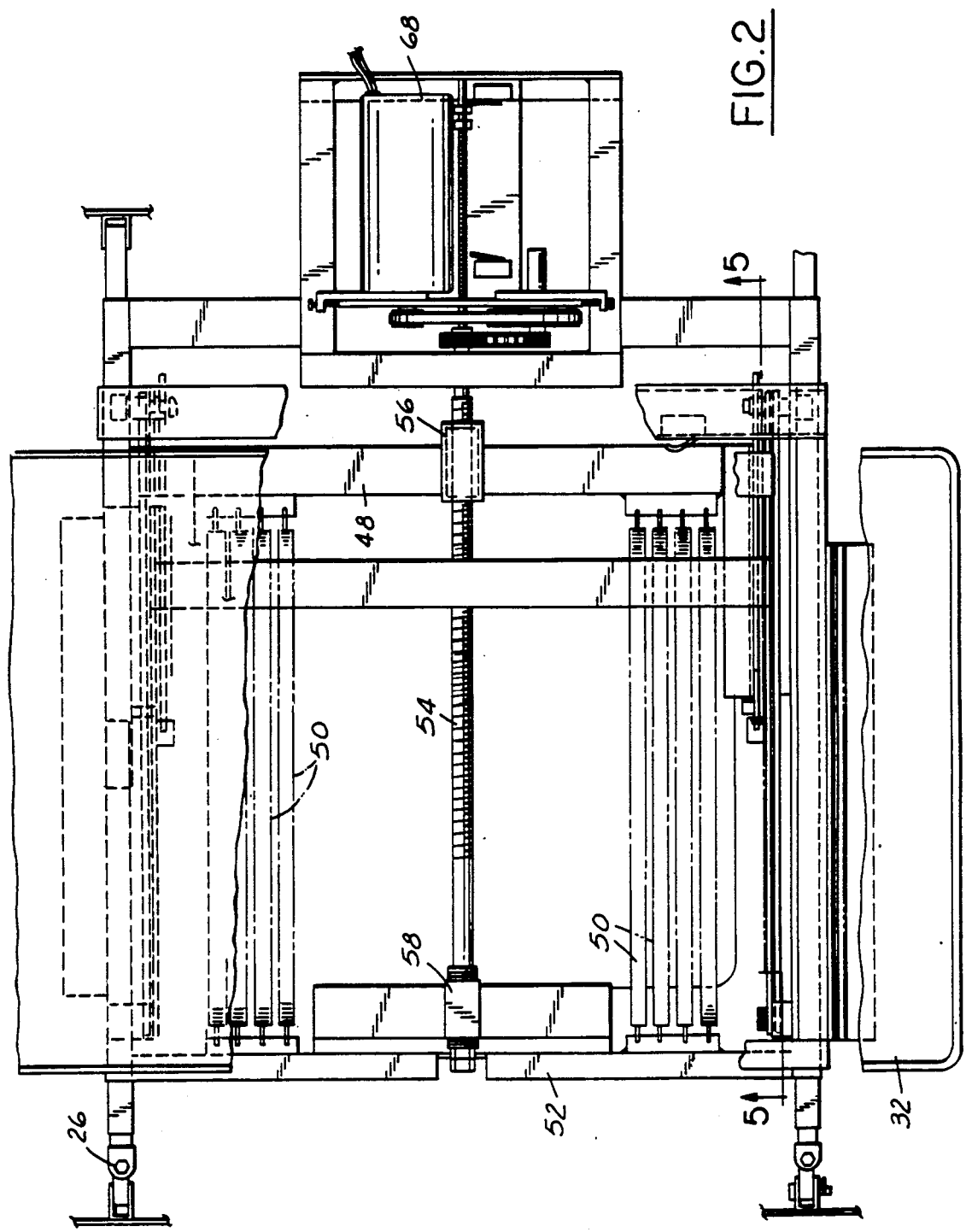
FIG. 2 is a top view showing details of the lift and presenting mechanism of the present invention.

As should be understood from FIG. 2, rotation of motor 68 causes actuation screw 54 to rotate and move threaded block 56 and crossbeam 48 longitudinally from forward to rear positions. Crossbeam 48 is restrained from rotating, and thus the rotation of the threads on actuation screw 54 within threaded block 56 cause crossbeam 48 and threaded block 56 to move longitudinally. Springs 50 normally bias crossbeam 48 toward rear base bar 52.

Figure 3:
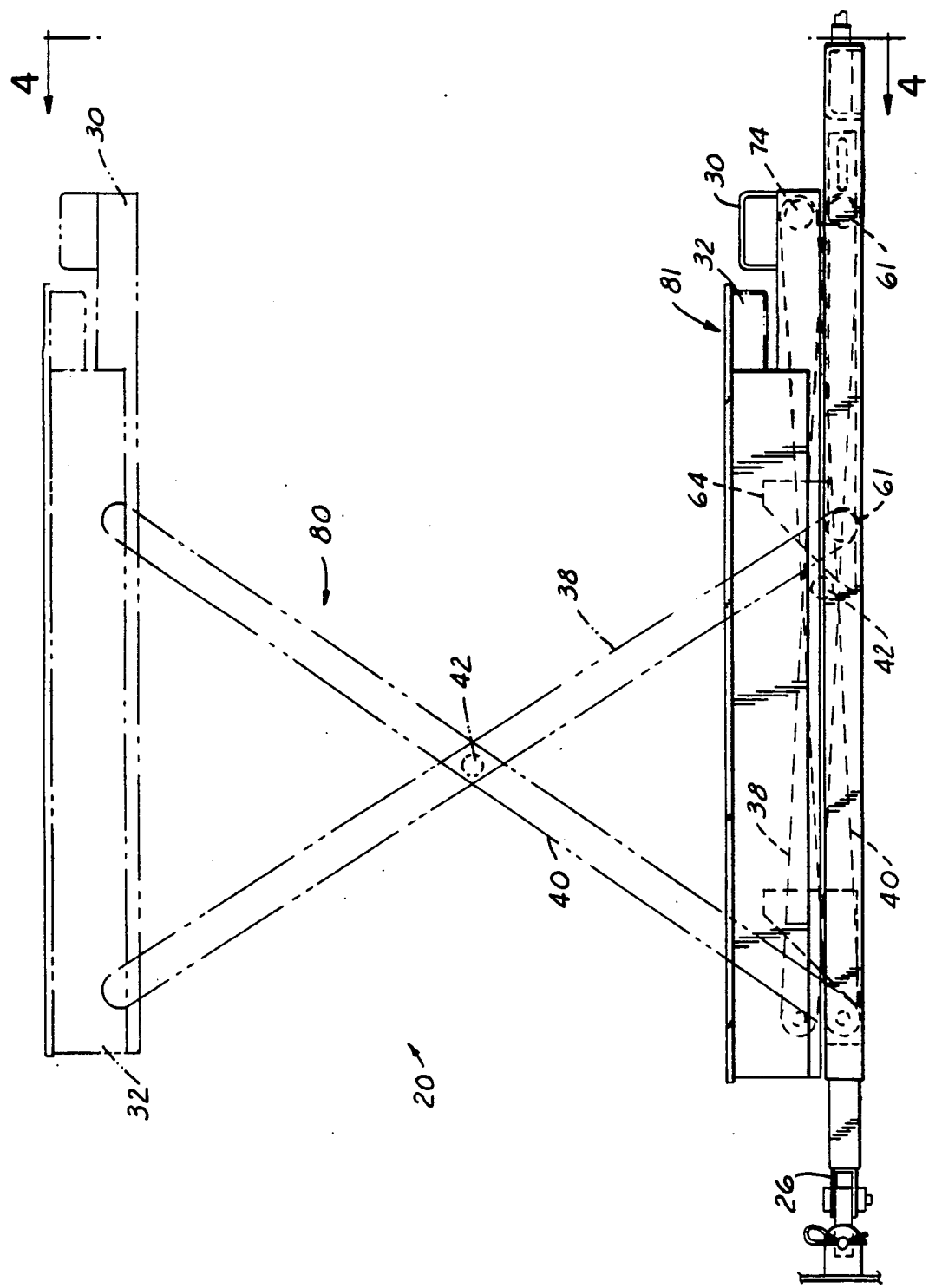
FIG. 3 is a side view showing the movement of the platform from a lowered storage position to a upwardly lifted position.
Figure 4:
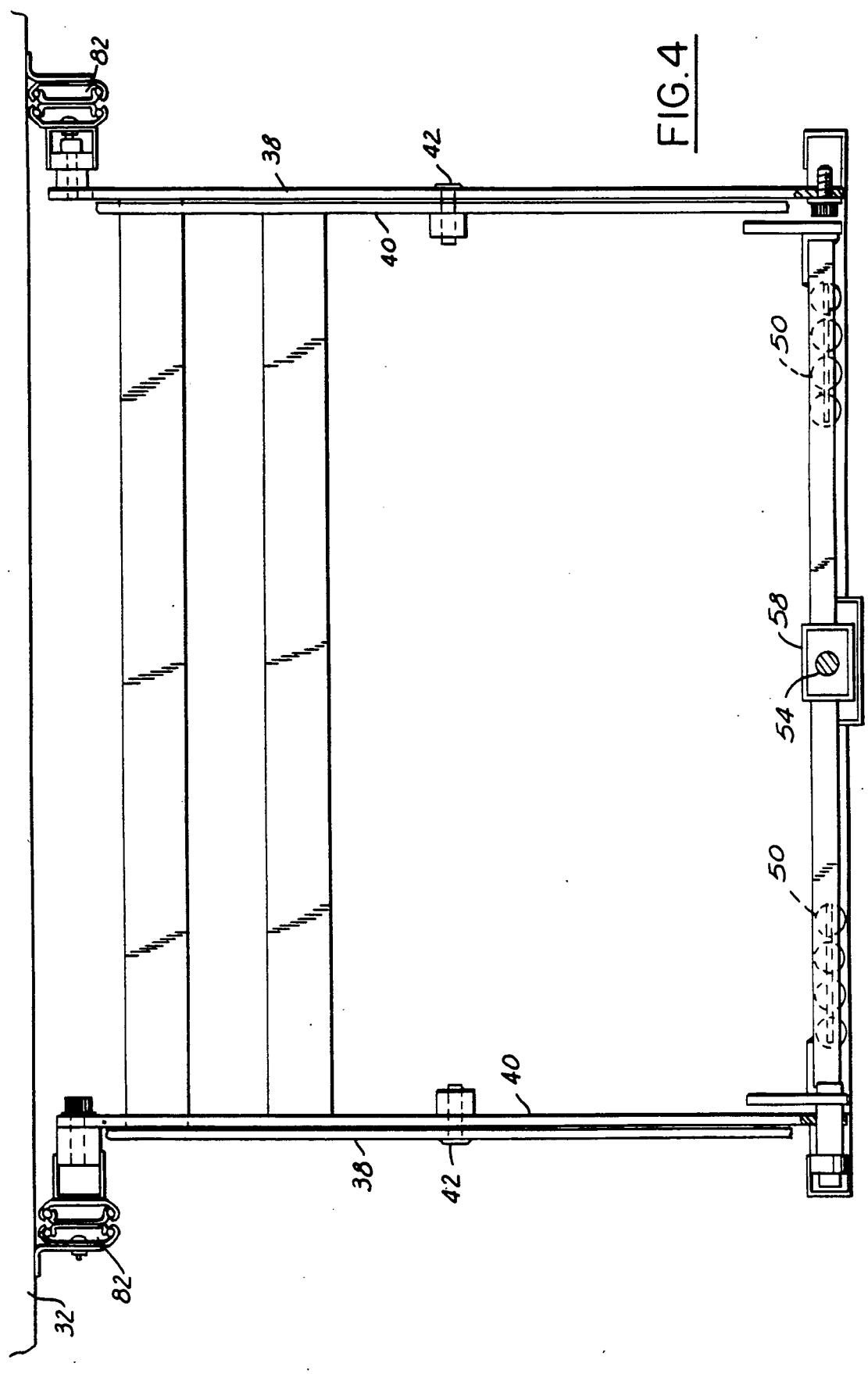
FIG. 4 is a cross-sectional view along line 4—4 as shown in FIG. 3.

The movement of lift and presenting mechanism 20 is illustrated in FIG. 3. As can be seen, when inside lift bar 40 and outside lift bar 38 have pivoted with respect to each other such that rollers 74 and 61 have moved longitudinally forwardly, lift bars 38 and 48 pivot and are lowered vertically. Platform member 30 is at a lowered storage position 81. When motor 68 is actuated rollers 61 and 74 move longitudinally rearwardly to allow the vertical extension of lift bars 38 and 40 causing movement of platform member 30 to vertically lifted position 80, shown in phantom.

The actuation of carriage assembly 36 to move platform member 30 from lowered storage position 81 to upwardly lifted position 80 is illustrated in FIGS. 5 and 7. When platform member 30 is in lowered storage position 81, start assist member 46 is at the position shown in FIG. 5 with inclined portion 83 of ramp 64 not yet in contact with central roller 44. Also, pin 60 is at a central position on slot 62. Start assist member 46 will not be in contact with pin 60 through slot 62 until it has moved a small longitudinal distance. When motor 68 is initially started to move platform member 30 to upwardly lifted position 80, start assist member 46 will move a small longitudinal distance until slot 62 engages pin 60. There will only be a small load applied to motor 68 during this movement allowing it to warm up. There will only be a small load on motor 68 since it will not yet be lifting platform member 30 and any stored articles.

Start assist member 46 eventually moves longitudinally rearwardly such that an inclined surface 83 of ramp 84 is in contact with central roller 44. At about the same time, pin 60 has moved to the forward extent of slot 62 such that further longitudinal movement of start assist member 46 will apply a force to pin 60 tending to move it longitudinally rearwardly. Upon further movement of start assist member 46, through crossbar 48, slot 62 moves pin 60 rearwardly while at the same time inclined portion 83 of ramp 64 assists the initiation of movement by forcing central roller 44 vertically upwardly. Start assist member 46 rolls on base 22 through roller 84.

At the position illustrated in FIG. 6, platform member 30 is beginning to be moved vertically upwardly. At this time, the inertia due to the weight of an article on platform member 30 must be overcome, and as shown in FIG. 6, start assist member 46 is applying forces tending to move carriage member 36 vertically upwardly at two locations. Inclined portion 83 is moving central roller 44 upwardly and causing bars 40 and 38 to pivot with respect to each other, while at the same time slot 62 is moving pin 60 and roller 61 longitudinally rearwardly to further cause the pivoting of bars 38 and 40.

As shown in FIG. 7, central roller 44 eventually moves vertically upwardly such that it leaves inclined portion 83 of ramp 64. Once start assist member 46 moves longitudinally rearwardly to the extent that central roller 44 has left inclined portion 83, the rest of the movement of platform member 30 is caused solely by the movement of pin 60 through slot 62. However, by this time the inertia of the article will have been overcome, and the load on motor 68 will be much lower.

FIG. 8 illustrates roller 84 on base arm 24. Ramp 64 is illustrated approaching central roller 44.

FIG. 9 illustrates pin 60 and roller 61 connected to inside lift bar 40. Pin 60 is received in slot 62 and roller 61 is received in base arm 24. Outside lift bar 38 is connected to roller 74 which is received in platform member 30.

The operation of lift and presenting mechanism 20 according to the present invention will now be disclosed with reference to the drawings. It is assumed an article has been stored on platform member 30 within the trunk of a vehicle. When it is desired to remove the article from the trunk, motor 68 is actuated and actuation screw 54 turns within threaded block 56. Crossbar 48 is constrained from rotating and moves longitudinally. As crossbar 48 moves longitudinally rearwardly, start assist member 46 will move a small longitudinal distance without any resulting movement of lift bars 38 and 40. Once start assist member 46 has moved through the small longitudinal distance, inclined portion 83 contacts central roller 44, and pin 60 reaches the end of slot 62. The motor has now had a chance to initially start and warm up and the load associated with overcoming the inertia of the article will not be placed upon the motor immediately upon start-up.

Inclined portion 83 begins to move central roller 44 vertically upwardly. Slot 62 begins to move pin 60 and associated roller 61 longitudinally rearwardly, which drives inside lift bar 40 to pivot with respect to outside lift bar 38. The combination of the inclined face 83 moving central roller 44 and slot 62 moving pin 60, assists in overcoming the inertia of an article that may be stored on platform member 30. Once the inertia has been overcome, central roller 44 is at a vertical position above inclined portion 83 and the rest of the movement of platform member 30 to the upwardly lifted position will be solely through the movement of pin 60 longitudinally rearwardly by slot 62.

When platform member 30 is at upwardly lifted position 80, an operator may easily remove the article from tray 32. Tray 32 is mounted on slides, and is movable from a retracted position where it overlies platform member 30, to a presenting position where it extends outwardly of the trunk from platform member 30. Handles 34 on tray 32 can be grasped to facilitate this movement.

Once the article is removed, motor 68 may be reversed, and actuation screw 54 rotates in an opposite direction to which it had previously been rotating. Crossbar 48 and threaded block 56 then begin moving longitudinally forwardly; for a period of time, pin 60 will be at the forward or righthand side of slot 62, as orientated in FIG. 7. Motor 68 moves start assist member 46 throughout the extent of slot 62 before it begins moving platform member 30 thus again allowing the motor to warm up . Once start assist member 46 has moved to such an extent that slot 62 abuts pin 60 at a rear portion, slot 62 will begin to move pin 60 forwardly and cause inside lift bar 40 to pivot with respect to outside lift bar 38, lowering platform member 30. Since an article may be placed on platform member 30 as it is lowered to a lowered storage position, it is important to have start assistance at this time also.

The actuation of motor 68 may be controlled automatically when a trunk opening switch in the cab of the vehicle is actuated, or switch 70 may be utilized to disconnect this automatic control. The various controls utilized with this invention are all well known in the art and may be standard motor control items.

The automatic actuation feature is time saving, since the article is being lifted as a operator exits a vehicle. The kill switch allows disconnection of the feature, which may be valuable when an article is not being stored on platform member 30.

A preferred embodiment of the present invention has been disclosed; however, those skilled in the art would realize that certain modifications would be obvious from this disclosure, and thus the following claims should be studied in order to determine the true scope and content of this invention.

What is claimed is:

1. A power-operated lift and presenting mechanism comprising:

a base;

a platform member, and a movable carriage assembly movably connecting said platform member to said base;

motor means for moving said platform member, via said carriage assembly, from a first lowered storage position to a second upwardly lifted position and returning said platform member to said lowered storage position;

assist means to assist the movement of said carriage assembly as it initially beings movement from either the first lowered storage position to the second upwardly lifted position or from the second upwardly lifted position to the first lowered storage position;

said carriage assembly including two lift bars, said lift bars being connected to each other at a central position by a central roller, one of said lift bars being pinned to said platform member and slidably mounted by a roller to said base, the other of said lift bars being pinned to said base and slidably mounted by a roller to said platform member;

said assist means including a ramp member with an inclined face that begins moving said central roller vertically upwardly;

said assist means also including a slot, said slot receiving a pin member connected to said one lift bar, said slot allowing an initial movement of said ramp member before said slot engages and begins to move said pin member.

2. A power-operated lift and presenting mechanism as recited in claim 1, wherein said motor means includes a reversible rotary motor, said reversible rotary motor rotatably driving an actuation screw, said actuation screw being received within a threaded block, said threaded block being fixed to a cross-bar, said crossbar causing movement of said carriage assembly to move said platform member.

3. A power-operated lift and presenting mechanism as recited in claim 1, wherein said platform member slidably receives a tray, said tray having handles, said handles and said tray being integrally molded as a one-piece plastic item.

4. A power-operated lift and presenting mechanism comprising:

a base;

a platform member adapted to have an article thereon, and a movable carriage assembly movably connecting said platform member to said base;

motor means for moving said platform member, via said carriage assembly, from a first lowered storage position to a second upwardly lifted position and returning said platform to said lowered storage position;

a start assist means to assist the movement of said carriage assembly as it initially begins movement from either the first lowered storage position to the second upwardly lifted position or from the second upwardly lifted position to the first lowered storage position;

said carriage assembly including a plurality of lift bars, said lift bars being connected to each other at a central position by a central roller, one of said lift bars being pinned to said platform member and slidably mounted by a roller to said base, and another of said lift bars being pinned to said base and slidably mounted by a roller to said platform member;

said start assist means including a ramp member with an inclined face that begins moving said central roller vertically upwardly;

said ramp member including a slot, said slot receiving a pin member connected to said one lift bar, said slot allowing initial movement of the ramp member before said slot engages and begins to move said pin member for the purpose of permitting said motor means to warm up before a load is placed on said motor means effective to raise or lower the article on the platform.

5. A power-operated lift and presenting mechanism as recited in claim 4, wherein said carriage assembly includes two pairs of lift bars at opposite sides thereof, each pair of lift bars being connected by a central roller, said start assist means including a pair of ramp members, one ramp member for each central roller of a different pair of lift bars.

* * * * *